US008684365B2

(12) United States Patent
Kondo

(10) Patent No.: US 8,684,365 B2
(45) Date of Patent: Apr. 1, 2014

(54) STABILIZER SYSTEM

(75) Inventor: Satoshi Kondo, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/580,228

(22) PCT Filed: Feb. 23, 2010

(86) PCT No.: PCT/JP2010/052778
§ 371 (c)(1),
(2), (4) Date: Aug. 21, 2012

(87) PCT Pub. No.: WO2011/104821
PCT Pub. Date: Sep. 1, 2011

(65) Prior Publication Data

US 2012/0313338 A1 Dec. 13, 2012

(51) Int. Cl.
*B60G 21/055* (2006.01)

(52) U.S. Cl.
USPC .............. 280/5.506; 280/5.511; 280/124.106; 318/273

(58) Field of Classification Search
USPC ............... 280/5.506, 5.511, 124.106, 124.13, 280/124.137; 318/273, 275
See application file for complete search history.

(56) References Cited

U.S. PATENT DOCUMENTS 7,301,295 B2 * 11/2007 Yamada ........................ 318/275
7,766,344 B2 * 8/2010 Buma ........................ 280/5.511

FOREIGN PATENT DOCUMENTS

| | | |
|---|---|---|
| JP | 2007 50842 | 3/2007 |
| JP | 2007 216723 | 8/2007 |
| JP | 2009 274575 | 11/2009 |

OTHER PUBLICATIONS

International Search Report Issued May 25, 2010 in PCT/JP10/52778 Filed Feb. 23, 2010.

* cited by examiner

*Primary Examiner* — Ruth Ilan
*Assistant Examiner* — Timothy Wilhelm
(74) *Attorney, Agent, or Firm* — Oblon, Spivak, McClelland, Maier & Neustadt, L.L.P.

(57) ABSTRACT

A stabilizer system is provided with a stabilizer bar configured to connect a left wheel and a right wheel of a vehicle to each other and suppress a roll of the vehicle by torsional reaction force, an actuator configured to control a relative torsional amount between a side of the left wheel and a side of the right wheel of the stabilizer bar, and a control device configured to control the actuator. The actuator can selectively operate in a permitting mode in which increase and decrease in the torsional amount is permitted or in a regulating mode in which the increase and decrease in the torsional amount is regulated.

3 Claims, 10 Drawing Sheets

| OPERATIONAL STATE OF ELECTROMAGNETIC MOTOR | | DETECTION SIGNAL OF HALL ELEMENT | | | SWITCHING OUTPUT OF SWITCHING ELEMENT | | | | | |
|---|---|---|---|---|---|---|---|---|---|---|
| | | $H_A$ | $H_B$ | $H_C$ | WLC | VLC | ULC | WHC | VHC | UHC |
| POWER SUPPLY STATE (drv STATE) | FORWARD DIRECTIONAL FORCE GENERATING STATE (CW STATE) | H | L | H | 0 | 0 | 1* | 0 | 1 | 0 |
| | | H | L | L | 0 | 0 | 1* | 1 | 0 | 0 |
| | | H | H | L | 0 | 1* | 0 | 1 | 0 | 0 |
| | | L | H | L | 0 | 1* | 0 | 0 | 0 | 1 |
| | | L | H | H | 1* | 0 | 0 | 0 | 0 | 1 |
| | | L | L | H | 1* | 0 | 0 | 0 | 1 | 0 |
| | BACKWARD DIRECTIONAL FORCE GENERATING STATE (CCW STATE) | H | L | H | 0 | 1* | 0 | 0 | 0 | 1 |
| | | H | L | L | 1* | 0 | 0 | 0 | 0 | 1 |
| | | H | H | L | 1* | 0 | 0 | 0 | 1 | 0 |
| | | L | H | L | 0 | 0 | 1* | 0 | 1 | 0 |
| | | L | H | H | 0 | 0 | 1* | 1 | 0 | 0 |
| | | L | L | H | 0 | 1* | 0 | 1 | 0 | 0 |
| POWER NON-SUPPLY STATE (brk STATE) | | | | | 0 | 0 | 0 | 1 | 1 | 1 |

1: ON STATE (CLOSE STATE)
0: OFF STATE (OPEN STATE)
H: DETECTION STATE
L: NON-DETECTION STATE

1*: DUTY CONTROL STATE BY PWM

FIG.9

EXAMPLE OF SETTING OF NUMBER OF BRAKE STAGES

| | UPPER FET | | | LOWER FET | | |
|---|---|---|---|---|---|---|
| | UH | VH | WH | UL | VL | WL |
| ONE | 1 | 0 | 0 | 0 | 0 | 0 |
| TWO | 1 | 1 | 0 | 0 | 0 | 0 |
| THREE | 1 | 1 | 1 | 0 | 0 | 0 |

*1: FET ON, 0: FET OFF

FIG.10

| | UPPER FET | | | LOWER FET | | |
|---|---|---|---|---|---|---|
| | UH | VH | WH | UL | VL | WL |
| ONE | 0 | 1 | 0 | 0 | 0 | 0 |
| TWO | 0 | 1 | 1 | 0 | 0 | 0 |
| THREE | 1 | 1 | 1 | 0 | 0 | 0 |

*1: FET ON, 0: FET OFF

STABILIZER SYSTEM

FIELD

The present invention relates to a stabilizer system.

BACKGROUND

A stabilizer provided with an actuator, which adjusts a torsional amount and torsional force of a stabilizer bar is conventionally suggested. For example, Patent Literature 1 discloses technology to set a brake mode according to a control state of roll suppression control means in brake mode setting means including the brake mode in which all of one switching element group out of an upper switching element group and a lower switching element group are put into a conducting state and all of the other switching element group are put into an interrupting state in a stabilizer control device, which controls the torsional force of the stabilizer by a brushless motor. In Patent Literature 1, it is judged to be a brake gradually changing control region when an absolute value of an actual angle of a motor is larger than the absolute value of a target angle and a brake gradually changing amount (duration time of a brake mode) is calculated according to deviation of the absolute value of the target angle from the absolute value of the actual angle.

CITATION LIST

Patent Literature

Patent Literature 1: Japanese Patent Application Laid-open No. 2007-50842

SUMMARY

Technical Problem

When the increase and decrease in the torsional amount of the stabilizer bar is regulated such as when braking in the actuator, vibration might be generated by regulation of the increase and decrease in the torsional amount to generate abnormal noise. It is desired to inhibit generation of the vibration in the stabilizer bar.

An object of the present invention is to provide the stabilizer system capable of inhibiting the generation of the vibration of the stabilizer bar in a stabilizer device provided with the actuator capable of regulating the increase and decrease in the torsional amount of the stabilizer bar.

Solution to Problem

A stabilizer system according to the present invention includes a stabilizer bar configured to connect a left wheel and a right wheel of a vehicle to each other and suppress a roll of the vehicle by torsional reaction force; an actuator configured to control a relative torsional amount between a side of the left wheel and a side of the right wheel of the stabilizer bar; and a control device configured to control the actuator, wherein the actuator is capable of selectively operating in a permitting mode in which increase and decrease in the torsional amount is permitted or in a regulating mode in which the increase and decrease in the torsional amount is regulated, the control device is capable of executing torsional amount control to approximate the torsional amount to a target torsional amount by allowing the actuator to alternately operate in the permitting mode and in the regulating mode, when the torsional amount becomes larger than the target torsional amount which is a target value of the torsional amount, and the control device makes a degree of regulation of the increase and decrease in the torsional amount by the regulating mode lower from start of the torsional amount control until it reaches a predetermined state set in advance than the degree after it reaches the predetermined state, the regulating mode is a brake mode to allow a brake to act for operation in a direction to increase/decrease the torsional amount in the actuator, and the control device preferably decreases the degree of regulation until it reaches the predetermined state by at least one of decrease in strength of the brake in the brake mode and decrease in ratio of a time period during which the actuator is allowed to operate in the brake mode in the torsional amount control.

In the stabilizer system, it is preferable that the predetermined state is the state in which at least one of a condition that a predetermined time period set in advance elapses from the start of the torsional amount control, a condition that a rotational angle to increase the torsional amount in the actuator is not larger than a predetermined angle, and a condition that a rotational angular speed in a direction to increase/decrease the torsional amount in the actuator is not higher than a predetermined speed, is established.

In the stabilizer system, it is preferable that the actuator is a brushless motor provided with a stator including coils of a plurality of phases and a rotor, the control device is preferably provided with a switching element connected to each of a high potential side and a low potential side for each of the plurality of phases and allows the brushless motor to operate in the regulating mode by turning off all of switching elements on the low potential side and turning on at least one of the switching elements on the high potential side, and the control device preferably decreases the degree of regulation by making an upper limit of the number of switching elements on the high potential side, which can be turned on, lower until it reaches the predetermined state than the upper limit after it reaches the predetermined state.

Advantageous Effects of Invention

The stabilizer system according to the present invention is provided with the actuator capable of selectively operating in the permitting mode in which the increase and decrease in the torsional amount in the stabilizer bar is permitted and the regulating mode in which the increase and decrease in the torsional amount is regulated and is capable of executing the torsional amount control to approximate the torsional amount to the target torsional amount by allowing the actuator to alternately operate in the permitting mode and the regulating mode when the torsional amount becomes larger than the target torsional amount. The degree of regulation of the increase and decrease in the torsional amount by the regulating mode is made lower from the start of the torsional amount control until it reaches the predetermined state set in advance than that after it reaches the predetermined state. The regulating mode is a brake mode to allow a brake to act for operation in a direction to increase/decrease the torsional amount in the actuator, and the control device decreases the degree of regulation until it reaches the predetermined state by at least one of decrease in strength of the brake in the brake mode and decrease in ratio of a time period during which the actuator is allowed to operate in the brake mode in the torsional amount control. According to this, the stabilizer system according to the present invention can achieve an effect that the generation of the vibration of the stabilizer bar can be inhibited.

BRIEF DESCRIPTION OF DRAWINGS

FIG. 5 is a view illustrating an example of a switching state of a switching element in each operational mode of the electromagnetic motor.

FIG. 9 is a view illustrating an example of correspondence relationship between the number of brake stages and a switching state of a switching element in a second embodiment.

FIG. 10 is another view illustrating the correspondence relationship between the number of brake stages and the switching state of the switching element.

DESCRIPTION OF EMBODIMENTS

Hereinafter, an embodiment of a stabilizer device according to the present invention is described in detail with reference to the drawings. Meanwhile, this invention is not limited by the embodiment. Components in the following embodiment include one easily conceived of by one skilled in the art or substantially identical one.

(First Embodiment)

A first embodiment is described with reference to FIGS. 1 to 8. This embodiment relates to a stabilizer system.

Figure 1:
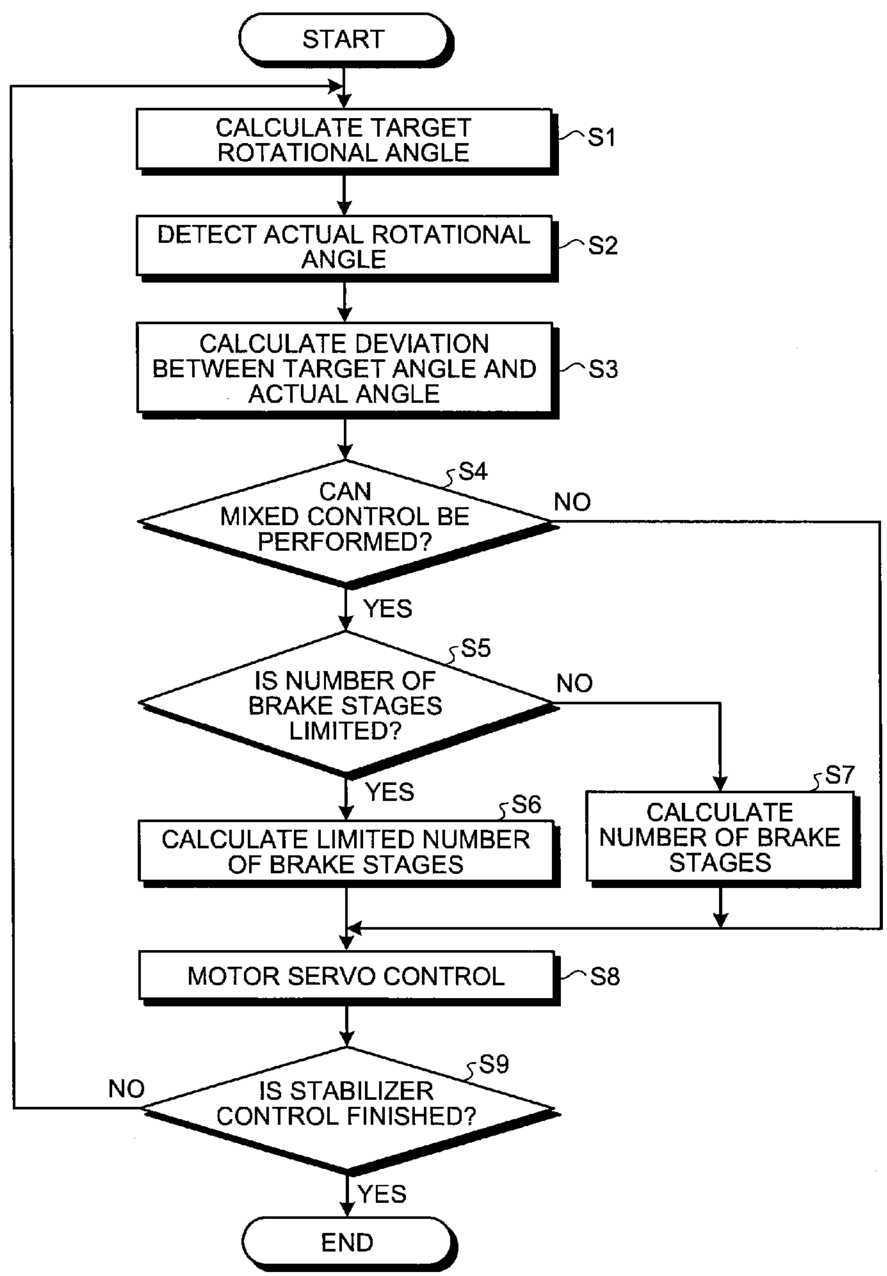
FIG. 1 is a flowchart illustrating operation of a stabilizer system of a first embodiment.
Figure 2:
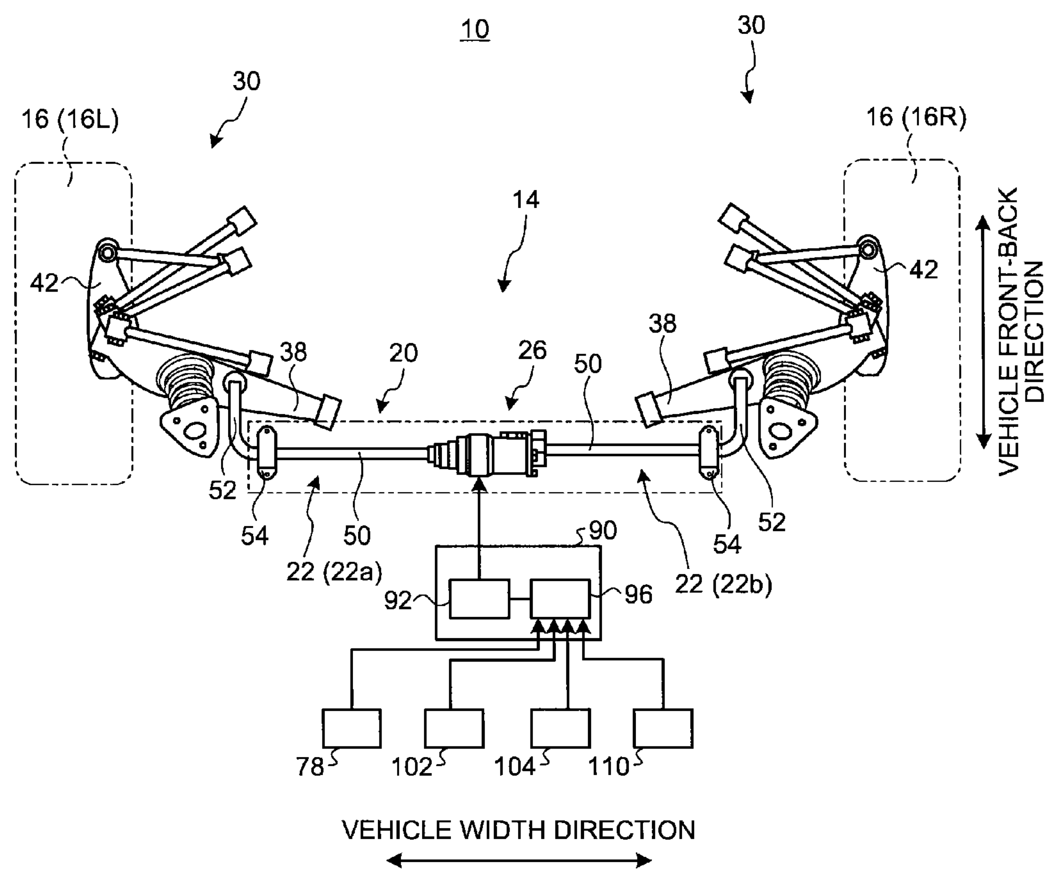
FIG. 2 is a schematic configuration diagram of the stabilizer system.
Figure 3:
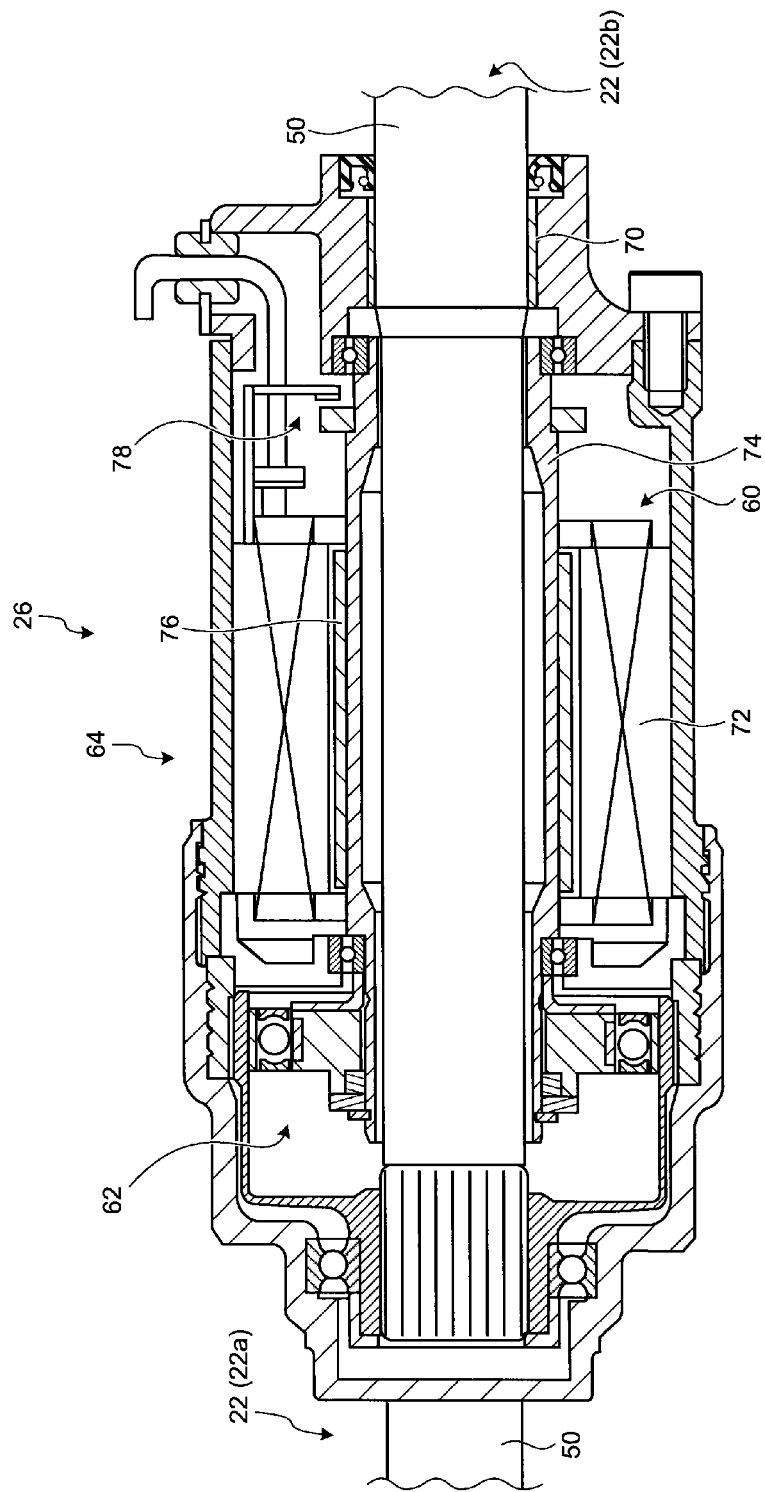
FIG. 3 is a view illustrating a schematic configuration of an actuator of a stabilizer device.

FIG. 1 is a flowchart illustrating operation of the first embodiment of the stabilizer system according to the present invention, FIG. 2 is a schematic configuration diagram of the stabilizer system according to this embodiment, and FIG. 3 is a view illustrating a schematic configuration of an actuator of the stabilizer device.

As illustrated in FIG. 2, a stabilizer system 10 is configured to include a stabilizer device 14. The stabilizer device 14 can be arranged on a front wheel side and a rear wheel side of a vehicle. The stabilizer device 14 is provided with a stabilizer bar 20 connected to suspension arms as wheel holding members, which hold right and left wheels 16, on both ends thereof. The stabilizer bar 20 connects a left wheel 16L and a right wheel 16R of the vehicle to each other and suppresses a roll of the vehicle by torsional reaction force. The stabilizer bar 20 is configured to include a pair of divided stabilizer bar members 22. The pair of stabilizer bar members 22 are connected to each other so as to be rotatable relative to each other by means of an actuator 26. The actuator 26 controls a relative torsional amount between a stabilizer bar member 22*a* on a left wheel side connected to the left wheel 16L and a stabilizer bar member 22*b* on a right wheel side connected to the right wheel 16R of the stabilizer bar 20.

The vehicle equipped with the stabilizer system 10 of this embodiment is provided with a suspension device corresponding to each wheel 16. In a following description, the stabilizer system 10 is described by taking the stabilizer device 14 arranged on a rear wheel as an example. As illustrated in FIG. 2, a suspension device 30 is an independent suspension system and is a multi-link suspension device. The suspension device 30 is provided with a lower arm 38, which is a suspension arm. One end of the lower arm 38 is rotatably connected to a vehicle body and the other end thereof is rotatably connected to an axel carrier 42, which rotatably holds the wheel 16.

Each stabilizer bar member 22 of the stabilizer device 14 can be separated into a torsion bar section 50 extending in a vehicle width direction and an arm section 52 integrated with the torsion bar section 50 and intersecting with the same to extend substantially toward a front portion of the vehicle as illustrated in FIG. 2. The torsion bar section 50 of each of the stabilizer bar members 22 is rotatably held by a holding member 54 fixedly provided on the vehicle body at a site in the vicinity of the arm section 52 and the torsion bar sections 50 are arranged so as to be coaxial with each other. An end of the torsion bar section 50 (the end on a side opposite to the arm section 52) is connected to the actuator 26 as described later in detail. On the other hand, an end of the arm section 52 (the end on a side opposite to the torsion bar section 50) is connected to the lower arm 38.

The actuator 26 is configured to include an electromagnetic motor 60 as a driving source and a decelerator 62, which decelerates rotation of the electromagnetic motor 60 to transmit as illustrated in FIG. 3. The electromagnetic motor 60 and the decelerator 62 are provided in a housing 64 as an outer shell member of the actuator 26. The end of the torsion bar section 50 of the stabilizer bar member 22*a* connected to the left wheel 16L, which is one of the pair of stabilizer bar members 22, is fixedly connected to one end of the housing 64. The other of the pair of stabilizer bar members 22 (the stabilizer bar member connected to the right wheel 16R) 22*b* is arranged in a manner extending from the other end of the housing 64 into the same to be connected to a motor shaft 74 through the decelerator 62. Further, the other 22*b* of the pair of stabilizer bar members 22 is rotatably held by the housing 64 through a bush bearing 70.

The electromagnetic motor 60 is configured to include a plurality of coils 72 fixedly arranged on a circumference along an inner surface of a peripheral wall of the housing 64, a hollow motor shaft 74 rotatably held by the housing 64, and permanent magnet 76 fixedly arranged on an outer periphery of the motor shaft 74 so as to face the coil 72. The electromagnetic motor 60 is the motor in which the coil 72 serves as a stator and the permanent magnet 76 serves as a rotor and is a three-phase DC brushless motor. The motor shaft 74 and the stabilizer bar member 22*b* are connected to each other through the decelerator 62 and the rotation of the motor shaft 74 is decelerated to be transmitted to the stabilizer bar member 22*b*. Meanwhile, a motor rotational angle sensor 78 for detecting a rotational angle of the motor shaft 74, that is to say, the rotational angle of the electromagnetic motor 60 is provided in the housing 64. The motor rotational angle sensor 78 is mainly formed of an encoder and is used for controlling the actuator 26, that is to say, for controlling the stabilizer device 14.

When roll moment acts on the vehicle body by turn and the like of the vehicle, force to relatively rotate the right and left stabilizer bar members 22, that is to say, external force to the actuator 26 acts. In this case, when the actuator 26 generates force against the external force by motor force generated by the electromagnetic motor 60, torsion is applied to one stabilizer bar 20 composed of the two stabilizer bar members 22*a* and 22*b*. The torsional reaction force generated by the torsion becomes the force against the roll moment. Then, by changing a relative rotational amount of the right and left stabilizer bar members 22 by changing a rotational amount of the actuator 26 by the motor force, the above-described roll suppressing force changes and it becomes possible to actively suppress the roll of the vehicle body. Meanwhile, the rotational amount of the actuator 26 is herein intended to mean the rotational amount from a neutral position, which is a rotational position of the actuator 26 in a reference state in which the vehicle stops on a flat road, that is to say, an operational amount. Therefore, the larger the rotational amount of the actuator 26, the farther the rotational position of the actuator 26 from the neutral position, and the larger the torsional reaction force of the stabilizer bar 20, that is to say, the roll suppressing force.

Figure 4:
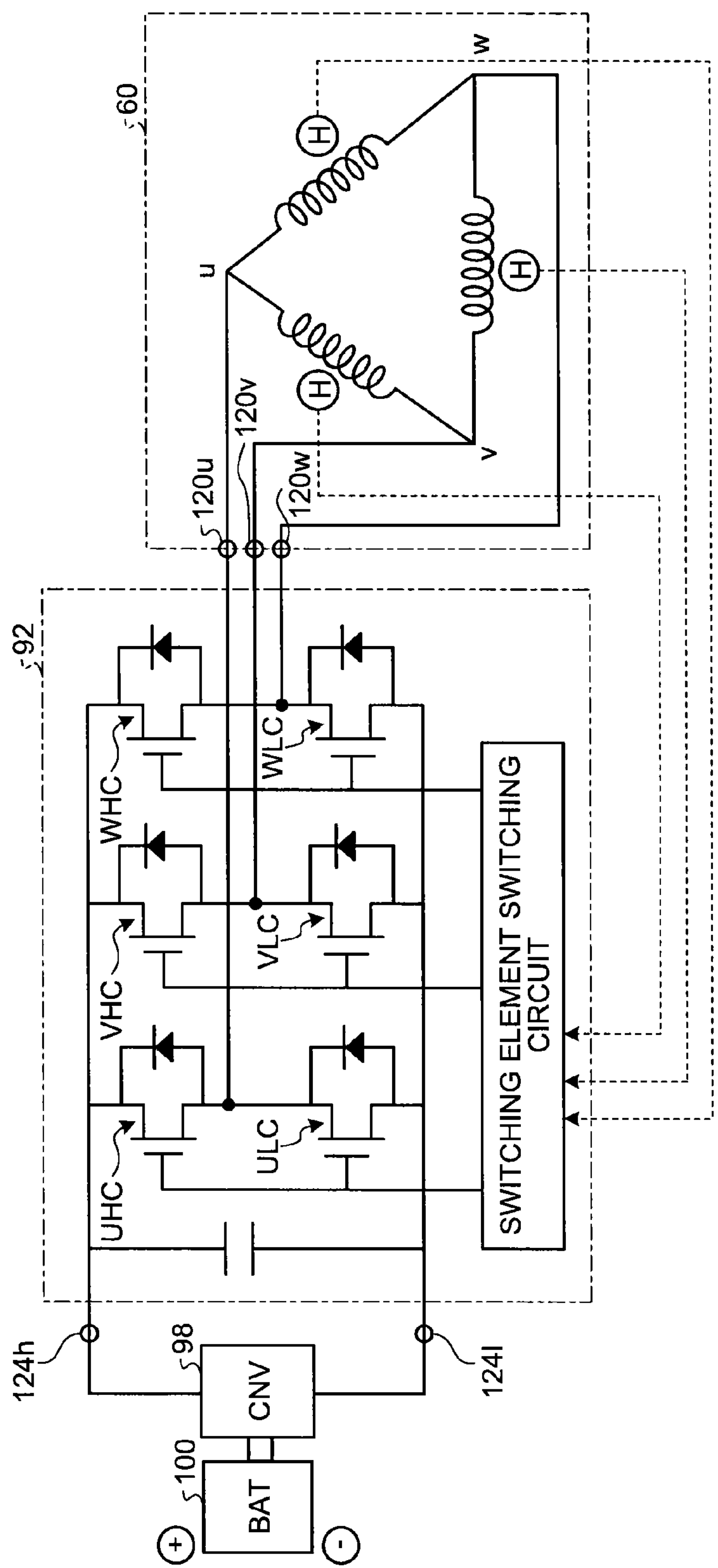
FIG. 4 is a circuit diagram illustrating a connection state of an inverter and an electromagnetic motor.

As illustrated in FIG. 2, an ECU (electronic control unit) 90 corresponding to the stabilizer device 14 is provided in the stabilizer system 10. The ECU 90 is a control device, which controls operation of the stabilizer device 14, in detail, each actuator 26, and is provided with an inverter 92 as a driving circuit corresponding to the electromagnetic motor 60 and a controller 96 mainly composed of a computer provided with the CPU, ROM, RAM and the like. FIG. 4 is a circuit diagram illustrating a connection state of the inverter 92 and the electromagnetic motor 60. As illustrated in FIG. 4, the inverter 92 is connected to a battery 100 through a converter 98 and is connected to the electromagnetic motor 60 of the corresponding stabilizer device 14. The electromagnetic motor 60 is driven at a constant voltage and supply power to the electromagnetic motor 60 is changed by changing a supply current amount. The inverter 92 changes a ratio (duty ratio) of pulse-on time and pulse-off time by PWM (pulse width modulation), thereby changing the supply current amount.

A steering sensor 102 for detecting an operational angle (steering amount) of a steering wheel not illustrated and a lateral acceleration sensor 104 for detecting actual lateral acceleration, which is the lateral acceleration actually generated in the vehicle body, are connected to the controller 96 of the ECU 90 in addition to the above-described motor rotational angle sensor 78. A vehicle speed sensor 110 for detecting a vehicle speed is further connected to the controller 96. Further, the controller 96 is also connected to each inverter 92 and controls the same, thereby controlling the electromagnetic motor 60 of the stabilizer device 14. Meanwhile, a program about control of each stabilizer device 14 to be described later, various data and the like are stored in the ROM provided on the computer of the controller 96.

In the stabilizer system 10, the actuator 26 is controlled such that an actual rotational amount by which the actuator 26 actually rotates becomes a target rotational amount, which is a target of the rotational amount, in order to generate the roll suppressing force according to the roll moment, which the vehicle body receives. That is to say, a direction of the motor force, which the electromagnetic motor 60 should generate (hereinafter, sometimes referred to as a "motor force direction"), and the supply current amount to the electromagnetic motor 60 are determined according to the roll moment, which the vehicle body receives. The ECU 90 controls the actuator 26 by allowing the electromagnetic motor 60 to operate according to the determined motor force direction and supply current amount to execute roll suppressing control by generating the roll suppressing force (torsional force of the stabilizer device 14) according to the roll moment, which the vehicle body receives. Meanwhile, since the rotational amount (the rotational amount in a direction to increase/decrease the torsional amount of the stabilizer bar 20) of the actuator 26 and a motor rotational angle, which is the rotational angle of the electromagnetic motor 60, are in correspondence relationship, the motor rotational angle is used in place of the rotational amount of the actuator 26 in actual control. The motor rotational angle is set to 0 in the reference state and the farther the motor rotational angle is from the neutral position, the larger an absolute value of the motor rotational angle.

The controller 96 of the ECU 90 determines a target motor rotational angle $\theta t$ of the electromagnetic motor 60 based on the lateral acceleration of the vehicle such that the stabilizer device 14 generates appropriate roll suppressing force according to the roll moment. The controller 96 determines control lateral acceleration Gyt, which is the lateral acceleration used in the control, by a following equation (1) based on estimated lateral acceleration Gyc estimated based on an operational angle $\delta$ of the steering wheel and a vehicle running speed v and actually measured actual lateral acceleration Gyr, for example:

$$Gyt=KA\cdot Gyc+KB\cdot Gyr \tag{1}$$

wherein, KA and KB represent gains.

Based on the control lateral acceleration Gyt determined in this manner, the target motor rotational angle $\theta t$ of the electromagnetic motor 60 is determined. Map data of the target motor rotational angle $\theta t$ having the control lateral acceleration Gyt as a parameter is stored in the controller 96 and the target motor rotational angle $\theta t$ of the electromagnetic motor 60 is determined with reference to the map data.

Then, the electromagnetic motor 60 is controlled such that the actual motor rotational angle $\theta$ becomes the above-described target motor rotational angle $\theta t$. In the control of the electromagnetic motor 60, the power supplied to the electromagnetic motor 60 is determined based on motor rotational angle deviation $\Delta\theta(=\theta t-\theta)$ as operational amount deviation, which is the deviation of the actual motor rotational angle $\theta$ from the target motor rotational angle $\theta t$. In detail, this is determined according to a method of feedback control based on the motor rotational angle deviation $\Delta\theta$. Specifically, first, the above-described motor rotational angle deviation $\Delta\theta$ is found based on a detection value of the motor rotational angle sensor 78 provided on the electromagnetic motor 60, and subsequently, target supply current it as target supply power is determined according to a following equation (2) using the same as the parameter:

$$it=KP\cdot\Delta\theta+KI\cdot \mathrm{Int}(\Delta\theta) \tag{2}$$

This equation follows PI control law in which first and second terms represent a proportional term and an integral term, respectively, and KP and KI represent a proportional gain and an integral gain, respectively. Since Int($\Delta\theta$) corresponds to a value of integral of the motor rotational angle deviation $\Delta\theta$ and is approximated by the target motor rotational angle $\theta t$ (also considered to be approximated by the actual motor rotational angle $\theta$), the above-described equation (2) can be considered to be equivalent to a following equation (3):

$$it=KP\cdot\Delta\theta+KI\cdot\theta t \tag{3}.$$

The target supply current it can be considered to also indicate the motor force direction of the electromagnetic motor 60 because a power supply direction differs according to a sign thereof. The duty ratio for the electromagnetic motor 60 and the motor force direction are determined based on the target supply current it and the electromagnetic motor 60 is allowed to operate according to them. In detail, a command about the motor force direction and the duty ratio based on the determined target supply current it is issued to the inverter 92, a switching element (for example, FET) provided on the inverter 92 is switched, and the electromagnetic motor 60 is controlled. The power is supplied from the battery 100 according to the determined duty ratio and an operational state of the electromagnetic motor 60 is put into a state in which the motor force is generated in the determined motor force direction.

Meanwhile, in this embodiment, a rotational direction of the electromagnetic motor 60 is set to a clockwise direction (forward direction) and a counterclockwise direction (backward direction) for convenience. When the electromagnetic motor 60 rotates in the clockwise direction (CW direction), the motor rotational angle θ increases. On the other hand, when the electromagnetic motor 60 rotates in the counterclockwise direction (CCW direction), the motor rotational angle θ decreases. Also, when the sign of the target supply current it is positive, the motor force direction is in the direction to increase the motor rotational angle θ (forward direction), and when the sign of the target supply current it is negative, the motor force direction is in the direction to decrease the motor rotational angle θ (backward direction). That is to say, when the sign of the target supply current it is positive, the operational state of the electromagnetic motor 60 is put into a state of generating the motor force in the forward direction by receiving the power according to the determined duty ratio from the battery 100 (hereinafter, sometimes referred to as a "forward directional force generating state" or a "cw state"), and when the sign of the target supply current it is negative, the operational state of the electromagnetic motor 60 is put into the state of generating the motor force in the backward direction by receiving the power according to the determined duty ratio from the battery 100 (hereinafter, sometimes referred to as a "backward directional force generating state" or a "ccw state").

That is to say, the operational state of the electromagnetic motor 60 when the power is supplied to the electromagnetic motor 60 (hereinafter, sometimes referred to as a "power supply state" or a "drive state" or a "drv state" in abbreviation, which means the state in which the electromagnetic motor 60 generates the driving force) includes the cw state and the ccw state. Further, the operational state of the electromagnetic motor 60 includes a state in which the power is not supplied from the battery 100 (hereinafter, sometimes referred to as a "power non-supply state" or a "brake state" or a "brk state" in abbreviation, which means the state in which braking force may be obtained). Herein, the brk state is the state in which conduction terminals of each phase of the electromagnetic motor 60 are brought into conduction with each other and the state in which as if the phases of the electromagnetic motor 60 are short-circuited to each other. In such a state, the electromagnetic motor 60 serves as a power generator and an effect of so-called short-circuit braking is obtained.

The operational state of the electromagnetic motor 60 is determined by a switching mode of the switching element of the inverter 92. As illustrated in FIG. 4, the electromagnetic motor 60 is a delta connected three-phase DC brushless motor and includes conduction terminals 120*u*, 120*v*, and 120*w* (hereinafter, sometimes collectively referred to as "conduction terminals 120" corresponding to each phase (U, V, and W), respectively. The inverter 92 is provided with two switching elements on a high (positive) side, which is a high potential side, and a low (negative) side, which is a low potential side, for each conduction terminal, that is to say, for each phase (U, V, and W) (hereinafter, six switching elements are referred to as "UHC", "ULC", "VHC", "VLC", "WHC", and "WLC"). A switching element switching circuit judges the rotational angle (electric angle) by a detection signal of three Hall elements Hs ($H_A$, $H_B$, and $H_c$) provided on the electromagnetic motor 60 and switches ON (conduction)/OFF (interruption) of each of the six switching elements based on the rotational angle. Meanwhile, the inverter 92 is connected to a terminal 124*h* on the high potential side and a terminal 124*l* on the low potential side of a power supply composed of the battery 100 and the converter 98.

FIG. 5 is a view illustrating an example of a switching state of the switching element in each operational mode of the electromagnetic motor 60. When describing with reference to FIG. 5, in the dry state, ON/OFF of the switching elements UHC, ULC, VHC, VLC, WHC, and WLC is switched according to a rotational phase of the electromagnetic motor 60 using a system referred to as so-called 120-degree conduction square wave driving. It is supposed that a switching pattern of the cw state and that of the ccw state are different from each other. Meanwhile, in the dry state, ON/OFF control according to the duty ratio, that is to say, duty control is performed for only the switching elements ULC, VLC, and WLC on the low side (this is indicated by "1*" in FIG. 5). On the other hand, in the brk state, all of the switching elements UHC, VHC, and WHC on the high side are put into an ON state and all of the switching elements ULC, VLC, and WLC on the low side are put into an OFF state irrespective of the rotational phase of the electromagnetic motor 60.

In the stabilizer system 10, in general, the electromagnetic motor 60 is controlled under a "power supply maintaining mode" in which the operational state is maintained at the dry state and power supply control is executed. The power supply maintaining mode includes a "forward directional force generating mode" in which the operational state of the electromagnetic motor 60 is maintained at the cw state and a "backward directional force generating mode" in which the operational state of the electromagnetic motor 60 is maintained at the ccw state. When the operational mode of the electromagnetic motor 60 is set to the forward directional force generating mode, the electromagnetic motor 60 is controlled to generate the motor force having strength corresponding to the absolute value of the determined target supply current it in the forward direction, and on the other hand, when the operational mode of the electromagnetic motor 60 is set to the backward directional force generating mode, the electromagnetic motor 60 is controlled to generate the motor force having the strength corresponding to the absolute value of the determined target supply current it in the backward direction.

In the stabilizer system 10 of this embodiment, when the actual motor rotational angle θ becomes larger than the target motor rotational angle θt, that is to say, when the torsional amount of the stabilizer bar 20 becomes larger than a target torsional amount, the rotational angle of the electromagnetic motor 60 is controlled by mixed control (torsional amount control) to be described later utilizing a brake mode (brk state). When the actual motor rotational angle θ becomes larger than the target motor rotational angle θt, the signs (positive and negative) of the first and second terms in the above-described equation (2) are different from each other. In a state in which the actual motor rotational angle θ is larger than the target motor rotational angle θt, the motor force direction corresponding to the first term including the motor rotational angle deviation Δθ and the rotational direction in which the roll moment is to rotate the electromagnetic motor 60 are in the same direction, so that there is a case in which the force to return the motor rotational angle becomes too strong. In this case, when it is tried to converge the actual motor rotational angle θ on the target motor rotational angle θt only by servo control (power supply control), the motor force direction is frequently switched by occurrence of hunting of the motor rotational angle and there is a problem that the motor load increases.

On the other hand, when the mixed control to alternately repeat (mix) the power supply state (servo control) and the power non-supply state (brake mode) is performed, a brake action is generated for variation in the motor rotational angle in the brake mode and increase and decrease in the motor rotational angle is regulated, so that it becomes possible to gradually change the motor rotational angle to approximate the same to the target motor rotational angle θt. Therefore, switching of the motor force direction is inhibited from occurring and control to approximate the actual motor rotational angle θ to the target motor rotational angle θt, in other words, the torsional amount control to approximate the actual torsional amount of the stabilizer bar 20 to the target torsional amount becomes possible while avoiding a problem of increase in the motor load and the like.

In the mixed control, the forward directional force generating mode or the backward directional force generating mode, which are the power supply state, and the brake mode, which is the power non-supply state, are alternately executed. In the power supply state, the actual motor rotational angle θ is approximated to the target motor rotational angle θt by the motor force to decrease the motor rotational angle deviation Δθ. That is to say, in the actuator 26, the power supply state is a permitting mode in which the increase and decrease in the torsional amount of the stabilizer bar 20 is permitted. On the other hand, in the brake mode, which is the power non-supply state, the electromagnetic motor 60 serves as the power generator, the actuator 26 exerts relatively large resistance when this is forced to perform the operation at high speed by an external input, and the stabilizer device 14 becomes nearly a general stabilizer device in which stabilizer rigidity cannot be changed. That is to say, in the actuator 26, the power non-supply state is a regulating mode in which the brake is allowed to act for operation in a direction to increase/decrease the torsional amount of the stabilizer bar 20 (the increase and decrease in the torsional amount is regulated). The actuator 26 may selectively operate in the permitting mode or in the regulating mode. The mixed control is brake gradually changing control to gradually change the motor rotational angle by mixing the power supply state and the power non-supply state in the one cycle.

In the mixed control, the braking force to inhibit the increase and decrease in the torsional amount (motor rotational angle) is controlled by a ratio of a time period during which it is put into the power non-supply state (in which the actuator 26 is operated in the brake mode). That is to say, macroscopic brake force is made variable by control of not the brake force itself but a time period during which the three phases are short-circuited. For example, when the ratio of the time period during which it is put into the power non-supply state is increased and the ratio of the time period during which it is put into the power supply state is decreased in the time period of the one cycle of the mixed control set in advance, the braking force increases. On the contrary, when the ratio of the time period during which it is put into the power non-supply state is decreased and the ratio of the time period during which it is put into the power supply state is increased, the braking force decreases. According to this, the macroscopic braking force (hereinafter, also referred to as "effective braking force") may be made variable in the one cycle even when the braking force itself in the power non-supply state is the same. The effective braking force may be set to a value obtained by time integration of the braking force in the one cycle, for example.

In the mixed control, there are several stages of the ratio of the time period during which it is put into the power non-supply state in the one cycle (hereinafter, simply referred to as "ratio of braking time") according to the deviation of the actual motor rotational angle θ from the target motor rotational angle θt, for example. The mixed control is executed when the motor rotational angle deviation Δθ is not larger than a threshold value Δθmax of the motor rotational angle deviation Δθ and when the actual motor rotational angle θ is near the target motor rotational angle θt. For example, when current motor rotational angle deviation Δθ is 25% of the threshold value Δθmax of the motor rotational angle deviation Δθ, it is put into the power non-supply state during a period of 75% of the one cycle of the mixed control and it is put into the power supply state during the period of remaining 25%.

Conventionally, in the mixed control, the farther the actual motor rotational angle θ from the target motor rotational angle θt, in other words, the larger the absolute value of the motor rotational angle deviation Δθ, the smaller the effective braking force is made, and the smaller the motor rotational angle deviation Δθ, the larger the effective braking force is made. However, when the effective brake force is determined only by the motor rotational angle deviation Δθ, large vibration is generated at an initial stage of the mixed control and the vibration might be transmitted through a body and the like to generate abnormal noise as described later.

Figure 6:
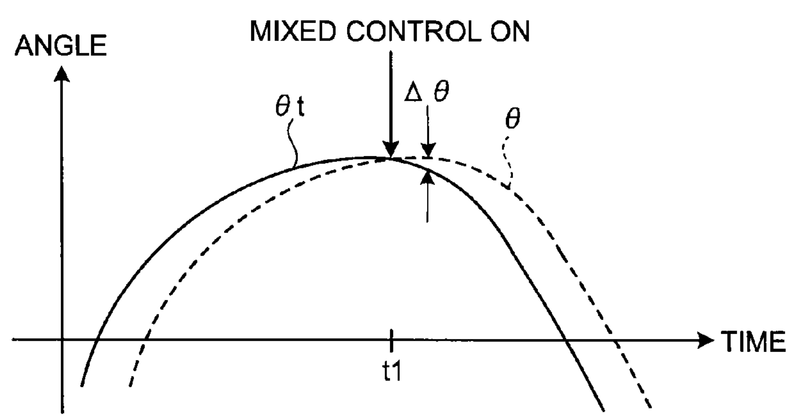
FIG. 6 is a view illustrating transition of an actual motor rotational angle and a target motor rotational angle.

FIG. 6 is a view illustrating an example of transition of the actual motor rotational angle θ and the target motor rotational angle θt. At time t1, the actual motor rotational angle θ becomes larger than the target motor rotational angle θt and the mixed control is turned on. Just after turn-on of the mixed control, the actual motor rotational angle θ has just passed the target motor rotational angle θt and the motor rotational angle deviation Δθ is small. Therefore, large effective braking force, for example, maximum effective braking force is selected in the mixed control. Herein, the mixed control is the control to brake the electromagnetic motor 60, which is rotated until then, so that when the effective braking force is too strong, the large vibration might be generated when the brake is turned on.

On the other hand, in the stabilizer system 10 of this embodiment, a degree of regulation of the increase and decrease in the torsional amount by the regulating mode is made lower from start of the torsional amount control until it reaches a predetermined state set in advance than that after it reaches the predetermined state. Specifically, an upper limit is set in the number of brake stages (ratio of the braking time) from the turn-on of the control until it reaches the predetermined state (for example, during a constant time period) such that the braking force is not excessive when the mixed control is turned on. Since the upper limit is set in the number of brake stages, the ratio of the time period during which the actuator 26 is operated in the brake mode in the torsional amount control is decreased and a maximum value of the effective braking force, which may be set, is decreased. According to this, drastic change in a motor rotational speed is inhibited. Therefore, generation of the vibration in the actuator 26 when the mixed control is started and the generation of the abnormal noise by propagation of the vibration are inhibited.

The operation of this embodiment is described with reference to the flowchart in FIG. 1.

First, the target motor rotational angle θt is calculated by the controller 96 of the ECU 90 at step S1. As described above, the controller 96 calculates the target motor rotational angle θt based on the lateral acceleration, for example, the estimated lateral acceleration Gyc and the actually measured actual lateral acceleration Gyr.

Next, the actual motor rotational angle θ is detected by the controller 96 at step S2. The controller 96 detects the actual motor rotational angle θ based on a signal input from the motor rotational angle sensor 78.

Next, the motor rotational angle deviation Δθ, which is the deviation of the actual motor rotational angle θ from the target motor rotational angle θt is calculated by the controller 96 at step S3. The controller 96 calculates the motor rotational angle deviation Δθ based on the target motor rotational angle θt calculated at step S1 and the actual motor rotational angle θ detected at step S2.

Next, it is judged whether the mixed control can be performed by the controller 96 at step S4. The controller 96 positively judges at step S4 when the actual motor rotational angle θ is larger than the target motor rotational angle θt and when the absolute value of the motor rotational angle deviation Δθ calculated at step S3 is not larger than the threshold value Δθmax set in advance.

Meanwhile, the threshold value Δθmax of the motor rotational angle deviation Δθ may be set to 1 deg, for example. As a result of the judgment at step S4, when it is judged that the mixed control may be performed (step S4-13 Yes), the procedure shifts to step S5, and otherwise (step S4-13 No), the procedure shifts to step S8.

It is judged whether the number of brake stages is limited by the controller 96 at step S5. The controller 96 counts a time period elapsed from the start of the mixed control by a timer and when the counted elapsed time period does not reach a predetermined time period set in advance, this judges that the number of brake stages is limited. Meanwhile, the predetermined time period may be constant or may be made variable according to a state amount and the like of the actuator 26. For example, this can be made variable according to the actual motor rotational angle θ when the mixed control is started, an angular speed of the motor rotational angle and the like. In this case, the larger the actual motor rotational angle θ and the angular speed of the motor rotational angle (absolute values thereof), the longer the predetermined time period may be made. As a result of the judgment at step S5, when it is judged that the number of brake stages is limited (step S5-13 Yes), the procedure shifts to step S6, and otherwise (step S5-13 No), the procedure shifts to step S7.

Limited number of brake stages is calculated by the controller 96 at step S6. Herein, the number of brake stages is intended to mean the number of periods during which it is put into the power non-supply state when the one cycle of the mixed control is divided into a plurality of periods. For example, when the one cycle is set to 1,200 μs and this is divided into four periods of 300 μs, if it is put into the power non-supply state during only one period of 300 μs out of one set of 1,200 μs, the number of brake stages is one, and if it is put into the power non-supply state during three periods of 900 μs, the number of brake stages is three. A maximum number of brake stages is four. Meanwhile, the maximum value of the number of brake stages, which may be selected, is not limited to four. The maximum value of the number of brake stages may be three or smaller or five or larger. For example, when the maximum value of the number of brake stages is set to five, it is possible to set the one stage to 300 μs to obtain the one cycle of 1,500 μs or to divide the one cycle of 1,200 μs into five to obtain the one stage of 240 μs.

The number of brake stages is selected according to a ratio of the current motor rotational angle deviation Δθ in the threshold value Δθmax of the motor rotational angle deviation Δθ. For example, in a case in which the maximum number of brake stages is four, when the ratio of the current motor rotational angle deviation Δθ in the threshold value Δθmax of the motor rotational angle deviation Δθ is smaller than 25%, smaller than 50%, smaller than 75%, and 75% or larger, this may be set to four, three, two, and one, respectively.

When the threshold value Δθmax of the motor rotational angle deviation Δθ is 1 deg and when the current motor rotational angle deviation Δθ is 0.25 deg (25% of threshold value), the number of brake stages is calculated to be three unless when the number of brake stages is limited. When the number of brake stages is three, out of 1,200 μs, it is put into the power non-supply state (brake mode) for 900 μs and it is set to servo driving in the power supply state for remaining 300 μs. In the servo driving, the motor force direction is in the direction to decrease the motor rotational angle deviation Δθ; however, when the roll moment is especially large and the like, it may be set in the direction to increase the motor rotational angle deviation Δθ.

On the other hand, during the limitation of the number of stages in which the number of brake stages is limited, the upper limit is set in the number of brake stages, which can be selected. During the limitation of the number of brake stages, the upper limit of the number of brake stages is made lower than that when the number of brake stages is not limited, and the number of the brake stages of two or larger is forbidden, for example. In this case, the number of brake stages larger than one is not allowed. According to this, the number of brake stages of one is calculated by the controller 96 during the limitation of the number of brake stages. When step S6 is executed, the procedure shifts to step S8.

When it is negatively judged at step S5, the number of brake stages is calculated by the controller 96 at step S7. Since the number of brake stages is not limited, the number of brake stages up to four is allowed. The controller 96 selects the number of brake stages from one to four according to the current motor rotational angle deviation Δθ. When step S7 is executed, the procedure shifts to step S8.

The servo control of the electromagnetic motor 60 according to current setting is performed by the controller 96 at step S8. When it is not judged that the mixed control may be performed (step S4-13 No), the controller 96 controls the electromagnetic motor 60 in the power supply maintaining mode in which the power non-supply state is not mixed. When it is judged that the mixed control may be performed (step S4-13 Yes), the controller 96 executes the mixed control based on the number of brake stages calculated at step S6 or S7.

Next, it is judged whether to finish stabilizer control by the controller 96 at step S9. The controller 96 performs the judgment at step S9 based on the lateral acceleration, for example. When a condition requiring the control of the motor rotational angle in the stabilizer device 14 is not established such as when corner running is finished, positive judgment is performed at step S9. As a result of the judgment, when it is judged to finish the stabilizer control (step S9-13 Yes), this control flow is finished, and otherwise (step S9-13 No), the procedure returns to step S1 and this control flow is repeatedly executed.

Figure 7:
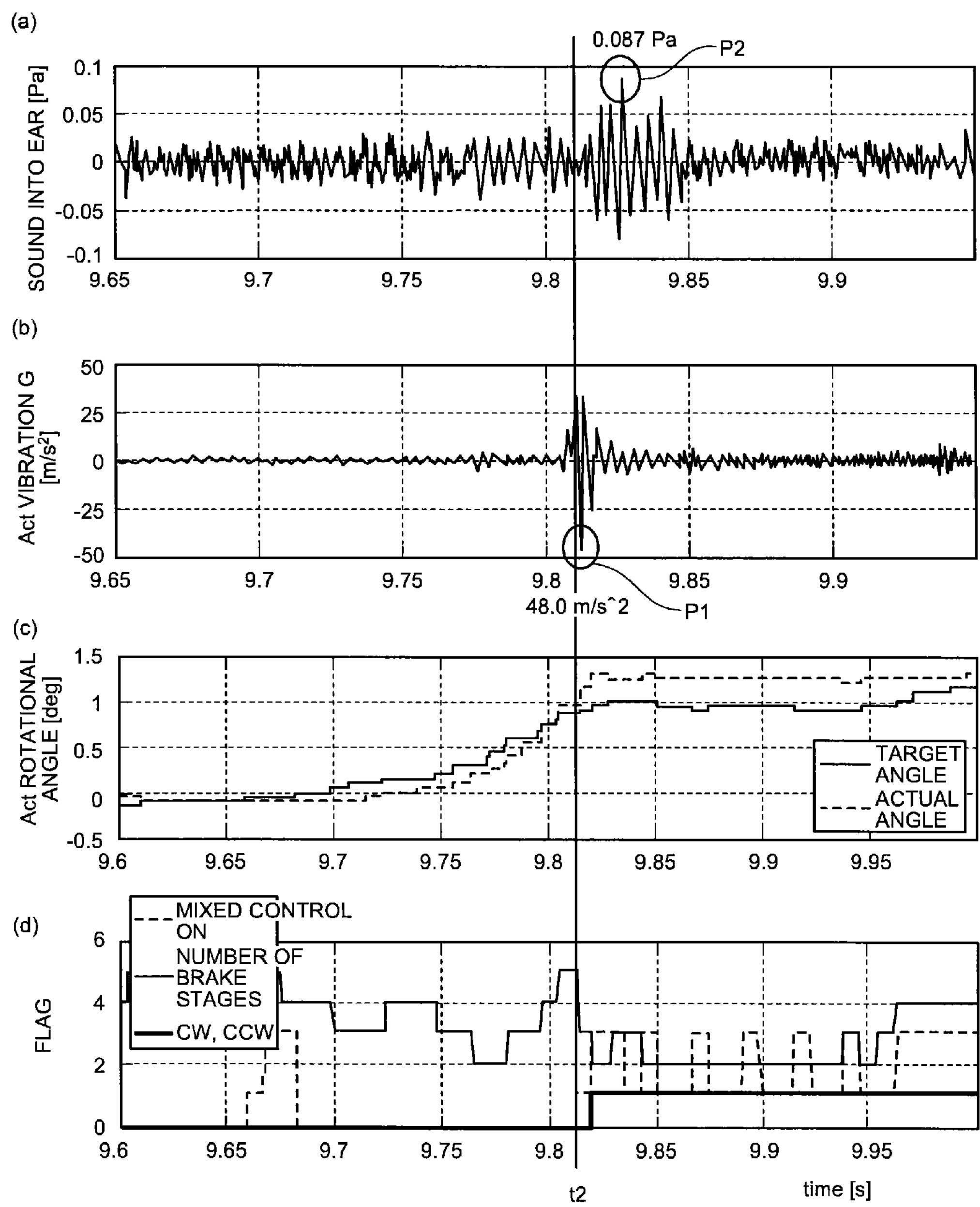
FIG. 7 is a time chart when the number of brake stages is not limited in mixed control.
Figure 8:
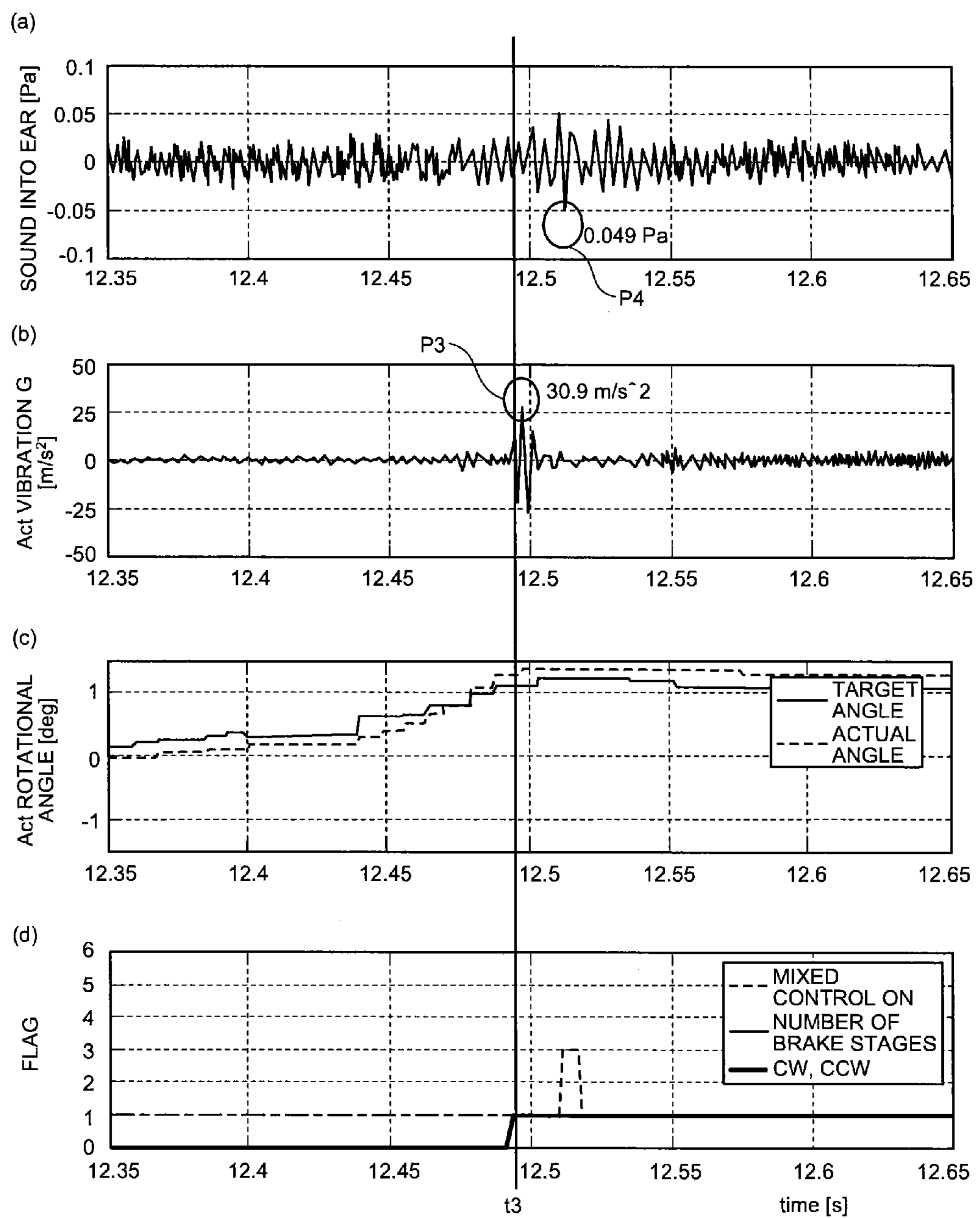
FIG. 8 is a time chart when the number of brake stages is limited in the mixed control.

FIG. 7 is a time chart when the number of brake stages is not limited in the mixed control and FIG. 8 is a time chart when the number of brake stages is limited in the mixed control in the stabilizer system 10 of this embodiment.

In FIGS. 7 and 8, (a) indicates a sound into ear, (b) indicates oscillatory acceleration of the motor, (c) indicates the motor rotational angle, and (d) indicates each flag. (a) The sound into the ear is the sound detected in a vehicle chamber and is a sound pressure detected at a position of the ear of a seated passenger, for example. (c) The target motor rotational angle θt (solid line) and the actual motor rotational angle θ (broken line) are indicated as the motor rotational angle. (d) A mixed control ON flag, the number of brake stages, and the motor force direction (cw, ccw) are indicated in the flag. The mixed control ON flag indicates an OFF state (mixed control cannot be performed) when a value thereof is set to 0 and indicates an ON state (mixed control can be performed) when the value thereof is 1 or larger. The motor force directions when the flag is 0 and 1 are different from each other.

As illustrated in FIG. 7, the absolute value of the actual motor rotational angle θ becomes larger than the absolute value of the target motor rotational angle θt at time t2 and the mixed control ON flag is put into the ON state. At that time, the deviation Δθ of the actual motor rotational angle θ from the target motor rotational angle θt is a small value, so that the number of brake stages is set to the maximum number of 5. According to this, the vibration is generated as indicated by a sign P1, and thereafter the sound into the ear increases as indicated by a sign P2.

On the other hand, in the stabilizer system 10 of this embodiment, the upper limit of the number of brake stages is limited at the initial stage of the mixed control.

FIG. 8 illustrates transition of each value when the upper limit of the number of brake stages is one when the number of brake stages is limited. The absolute value of the actual motor rotational angle θ becomes larger than the target motor rotational angle θt and the mixed control ON flag is turned on at time t3. At that time, the number of brake stages is limited to one and the effective braking force is weak, so that the oscillatory acceleration of the motor (refer to sign P3) decreases from the oscillatory acceleration (refer to sign P1) when the number of brake stages is not limited. Therefore, the sound into the ear when the number of brake stages is limited (refer to sign P4) is decreased from the sound into the ear when the number of brake stages is not limited (P2).

In this manner, according to the stabilizer system 10 of this embodiment, the generation of the vibration when regulating the increase and decrease in the torsional amount of the stabilizer bar 20 by the actuator 26 is inhibited, and especially, the generation of the vibration when regulating the increase and decrease in the motor rotational angle is inhibited in the mixed control when the actual motor rotational angle θ becomes larger than the target motor rotational angle θt. Since the generation of the vibration and the abnormal noise is inhibited, drivability can be improved.

Meanwhile, the actuator 26 of the stabilizer system 10 is not limited to the brushless motor. For example, the actuator 26 may be a brushed DC motor and may be another actuator capable of operating in the regulating mode in which the increase and decrease in the torsional amount of the stabilizer bar 20 is regulated.

Although it is put into the power supply state during the time period other than the time of the brake mode in the one cycle and the servo driving is performed in the mixed control in this embodiment, there is no limitation and the electromagnetic motor 60 may be put into a state other than the servo driving. For example, it is possible to decrease the motor rotational angle deviation Δθ by the roll moment without supplying the power during the time period other than the time of the brake mode. In this case, all of the switching elements are turned off, for example, and according to this, the electromagnetic motor 60 may be put into the permitting mode in which the increase and decrease in the motor rotational angle is permitted.

Meanwhile, although the actuator 26 is allowed to alternately operate in the permitting mode and in the regulating mode in this embodiment, it is also possible that a plurality of permitting modes are continuously executed in the permitting mode between the regulating mode and the next regulating mode. In this case, it is possible that the identical permitting mode is continuously executed a plurality of times, and when the actuator 26 may operate in a plurality of permitting modes of different types, it is possible that the permitting modes of a plurality of types are continuously executed. Similarly, it is also possible that a plurality of regulating modes are continuously executed in the regulating mode between the permitting mode and the next permitting mode. In this case, the identical regulating mode or the regulating modes of a plurality of types can be continuously executed.

(First Modified Example of First Embodiment)

Although a “predetermined state” is a state in which a condition that a predetermined time period elapses from start of mixed control is established in the above-described first embodiment, there is no limitation. For example, a state in which a condition that an angular speed of a motor rotational angle (absolute value) is not higher than a predetermined speed set in advance is established may be made the predetermined state or a state in which a condition that an actual motor rotational angle θ (absolute value), that is to say, a rotational angle to increase a torsional amount of the stabilizer bar 20 is not larger than a predetermined angle set in advance is established may be made the predetermined state. Also, a case in which two or more of the above-described three conditions are established may be made the predetermined state. The predetermined state may be a state in which it is predicted that large vibration is not generated even when effective braking force is set to a large value and the mixed control is executed.

(Second Embodiment)

A second embodiment is described with reference to FIGS. 9 and 10. In the second embodiment, same reference signs are assigned to members having a function similar to that described in the above-described embodiment and the description is not repeated. FIG. 9 is a view illustrating an example of correspondence relationship between the number of brake stages and a switching state of a switching element in the second embodiment.

Mixed control of this embodiment is different from the mixed control of the above-described first embodiment in that a degree of regulation of increase and decrease in torsional amount of a stabilizer bar 20 is adjusted not by an execution time period of a brake mode (effective braking force) but by strength of the braking force itself in the brake mode. Specifically, the strength of a brake is adjusted by changing the number of switching elements to be turned on of a high-side switching element group in the brake mode. It is possible that the electromagnetic motor 60 operates in the brake mode as a regulating mode by turning off all of the switching elements on a low side (low potential side) and turning on at least one switching element on a high side (high potential side) without turning on all of the switching elements on the high side (high potential side).

As illustrated in FIG. 9, when the number of brake stages is one, only a high-side switching element UHC of a U-phase is turned on and high-side switching elements VHC and WHC of a V-phase and a W-phase are turned off.

When the number of brake stages is two, the high-side switching elements UHC and VHC of the U-phase and the V-phase are turned on and the high-side switching element WHC of the W-phase is turned off. When the number of brake stages is three, all of the high-side switching elements UHC, VHC, and WHC are turned on as in the brake mode of the above-described first embodiment. An effect of short-circuit braking (braking force) when the number of brake stages is one is the weakest and the braking force when the number of brake stages is three is the strongest. The braking force when the number of brake stages is two has the strength between the braking force when the number of stages is one and that when the number of stages is three.

As in the above-described first embodiment, an upper limit of the number of brake stages is limited from start of the mixed control until it reaches a predetermined state and the upper limit of the number of switching elements on the high potential side, which may be turned on, is limited. For example, the upper limit of the number of brake stages when the number of brake stages is limited may be set to one. In this case, the number of brake stages, which may be selected, is one at the maximum. Also, when the upper limit of the number of the brake stages is set to two, the number of brake stages, which may be selected, is one or two. The upper limit of the number of brake stages until it reaches the predetermined state is made lower than the upper limit of the number of brake stages after it reaches the predetermined state, and according to this, the degree of regulation of the increase and decrease in the torsional amount until it reaches the predetermined state in the mixed control (torsional amount control) is decreased and generation of vibration at the start of the mixed control is inhibited. Meanwhile, a ratio of braking time may be made constant irrespective of whether the number of brake stages is limited or may be made variable according to presence of the limitation of the number of brake stages. For example, if a time period of a power non-supply state is made shorter when the number of brake stages is limited than that when this is not limited, it is possible to improve an effect of inhibiting the generation of the vibration.

Meanwhile, flexibility of braking force setting is improved by making the number of switching elements to be turned on in the high-side switching element group (hereinafter, simply referred to as "number of brake mode ON devices") and the ratio of the braking time variable in the brake mode. If three types of the number of brake mode ON devices from one to three may be selected and four types of ratios of the braking time may be selected, up to 12 brake stages may be set. The number of brake stages may be selected based on two parameters, which are motor rotational angle deviation $\Delta\theta$ and an angular speed of a motor rotational angle, for example. In this case, it is possible to simply determine the number of brake stages based on the motor rotational angle deviation $\Delta\theta$ and the angular speed of the motor rotational angle such that the number of brake mode ON devices and the ratio of the braking time are determined according to the number of brake stages or to select one of (the number of brake mode ON devices and the ratio of the braking time) based on one of (the motor rotational angle deviation $\Delta\theta$ and the angular speed of the motor rotational angle) and select the other of (the number of brake mode ON devices and the ratio of the braking time) based on the other of (the motor rotational angle deviation $\Delta\theta$ and the angular speed of the motor rotational angle), thereby determining the number of brake stages. For example, it is possible to determine the ratio of the braking time (length of a time period during which variation in the motor rotational angle is regulated) according to the motor rotational angle deviation $\Delta\theta$ and determine the number of brake mode ON devices (strength of the brake) according to the angular speed of the motor rotational angle.

Meanwhile, correspondence relationship between the number of brake stages and the switching state of the switching element is not limited to that illustrated in FIG. 9 and this may be that illustrated in FIG. 10, for example. FIG. 10 is another view illustrating the correspondence relationship between the number of brake stages and the switching state of the switching element. That is to say, the phase of the switching element to be turned on is optional when it is configured that one of U, V, and W phases is short-circuited when the number of brake stages is one, any two thereof are short-circuited when the number of brake stages is two, and all three thereof are short-circuited when the number of brake stages is three. Also, the number of phases of a stator of the electromagnetic motor 60 is not limited to three and the stator may include coils of a plurality of phases.

According to this embodiment, inhibition of the vibration (abnormal noise) and a brake function can be balanced in a higher state by adjusting not the braking time but the braking force itself.

The above-described embodiments may be appropriately combined to be executed.

INDUSTRIAL APPLICABILITY

As described above, the stabilizer system according to the present invention is useful in the stabilizer device provided with the actuator capable of regulating the increase and decrease in the torsional amount of the torsion bar and is especially suitable for inhibiting the generation of the vibration.

REFERENCE SIGNS LIST

10 STABILIZER SYSTEM
14 STABILIZER DEVICE
16 WHEEL
20 STABILIZER BAR
26 ACTUATOR
60 ELECTROMAGNETIC MOTOR
78 MOTOR ROTATIONAL ANGLE SENSOR
90 ECU
92 INVERTER
96 CONTROLLER
98 CONVERTER
100 BATTERY
$\theta$ ACTUAL MOTOR ROTATIONAL ANGLE
$\theta t$ TARGET MOTOR ROTATIONAL ANGLE
$\Delta\theta$ MOTOR ROTATIONAL ANGLE DEVIATION
It TARGET SUPPLY CURRENT

The invention claimed is:

1. A stabilizer system comprising:

a stabilizer bar that connects a left wheel and a right wheel of a vehicle to each other and that suppresses a roll of the vehicle by torsional reaction force;

an actuator that controls a relative torsional amount between a side of the left wheel and a side of the right wheel of the stabilizer bar; and a control device that controls the actuator, wherein the actuator selectively operates in one of a permitting mode, in which increase and decrease in the torsional amount is permitted, or a regulating mode, in which the increase and decrease in the torsional amount is regulated, wherein the control device executes torsional amount control to approximate the torsional amount to a target torsional amount by allowing the actuator to alternately operate in the permitting mode and in the regulating mode, when the torsional amount becomes larger than the target torsional amount which is a target value of the torsional amount, wherein the control device makes a degree of regulation of the increase and decrease in the torsional amount by the regulating mode lower from a start of the torsional amount control until a predetermined state set in advance is reached than the degree after the predetermined state is reached, wherein the regulating mode is a brake mode to allow a brake to act for operation in a direction to increase/decrease the torsional amount in the actuator, wherein the actuator adjusts a strength of the brake in the brake mode, and wherein the control device decreases the degree of regulation until the predetermined state is reached by at least one of a decrease in the strength of the brake in the brake mode and a decrease in ratio of a time period during which the actuator is allowed to operate in the brake mode in the torsional amount control.

2. The stabilizer system according to claim 1, wherein the predetermined state is a state in which at least one of a condition that a predetermined time period set in advance elapses from the start of the torsional amount control, a condition that a rotational angle to increase the torsional amount in the actuator is not larger than a predetermined angle, and a condition that a rotational angular speed in a direction to increase/decrease the torsional amount in the actuator is not higher than a predetermined speed, is established.

3. The stabilizer system according to claim 1, wherein the actuator is a brushless motor including a stator including coils of a plurality of phases, and a rotor, wherein the control device includes a switching element connected to each of a high potential side and a low potential side for each of the plurality of phases, and the control device controls the brush less motor to operate in the regulating mode by turning off all of the switching elements on the low potential side and turning on at least one of the switching elements on the high potential side, and wherein the control device decreases the degree of regulation by making an upper limit of a number of switching elements on the high potential side, which can be turned on in the regulating mode, lower until the predetermined state is reached than the upper limit after the predetermined state is reached.

* * * * *